United States Patent
Sobanski et al.

(10) Patent No.: US 12,359,622 B2
(45) Date of Patent: Jul. 15, 2025

(54) VANE SUPPORT SYSTEM

(71) Applicant: United Technologies Corporation, Farmington, CT (US)

(72) Inventors: Jon E. Sobanski, Glastonbury, CT (US); Howard J. Liles, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 950 days.

(21) Appl. No.: 16/844,596

(22) Filed: Apr. 9, 2020

(65) Prior Publication Data
US 2021/0317786 A1   Oct. 14, 2021

(51) Int. Cl.
*F02C 7/20*   (2006.01)
*F01D 9/04*   (2006.01)
*F01D 25/24*  (2006.01)

(52) U.S. Cl.
CPC .............. *F02C 7/20* (2013.01); *F01D 9/042* (2013.01); *F01D 25/246* (2013.01); *F05D 2240/11* (2013.01); *F05D 2240/80* (2013.01)

(58) Field of Classification Search
CPC .... F02C 7/20; F05D 2240/11; F05D 2240/80; F05D 2240/81; F01D 9/042; F01D 25/246
See application file for complete search history.

(56) References Cited

U.S. PATENT DOCUMENTS

| | | | |
|---|---|---|---|
| 4,395,195 A * | 7/1983 | De Cosmo ............ | F01D 17/162 415/137 |
| 6,375,415 B1 * | 4/2002 | Burdgick ................. | F01D 5/18 415/115 |
| 9,546,557 B2 | 1/2017 | Grooms, III et al. | |
| 10,309,240 B2 | 6/2019 | Heitman et al. | |
| 2009/0097966 A1 * | 4/2009 | McCaffrey ............ | F01D 17/162 415/130 |

(Continued)

FOREIGN PATENT DOCUMENTS

| | | |
|---|---|---|
| DE | 102009003714 | 10/2009 |
| EP | 2995777 | 3/2016 |

(Continued)

OTHER PUBLICATIONS

European Search Report for European Patent Application No. 21167664.8 completed Jul. 22, 2021.

(Continued)

*Primary Examiner* — Thomas P Burke
(74) *Attorney, Agent, or Firm* — Carlson, Gaskey & Olds, P.C.

(57) ABSTRACT

A gas turbine engine support system includes a support arc segment piece that defines radially inner and outer sides, axially forward and aft sides, and first and second circumferential mate face sides. The radially inner side has a radially open socket that is configured to engage a mating component and transmit loads from the mating component. The radially open socket is elongated in an axial direction with respect to the axially forward and aft sides The support arc segment piece has radial and axial reaction surfaces that are configured, respectively, to transmit radial and axial components of the loads from the mating component.

18 Claims, 4 Drawing Sheets

(56) References Cited

U.S. PATENT DOCUMENTS

| | | | | |
|---|---|---|---|---|
| 2009/0252610 A1* | 10/2009 | Wassynger | ............. | F01D 9/042 416/220 R |
| 2010/0054932 A1* | 3/2010 | Schiavo | ................ | F01D 5/147 415/200 |
| 2013/0209248 A1* | 8/2013 | Ring | ...................... | F01D 9/042 415/209.3 |
| 2017/0051619 A1 | 2/2017 | Tuertscher | | |
| 2020/0072066 A1 | 3/2020 | Thomas et al. | | |

FOREIGN PATENT DOCUMENTS

| | | |
|---|---|---|
| EP | 3009608 | 10/2019 |
| EP | 3683405 | 7/2020 |
| EP | 3708785 | 9/2020 |
| EP | 3800327 | 4/2021 |

OTHER PUBLICATIONS

European Search Report for European Patent Application No. 24152960.1 mailed Mar. 19, 2024.

\* cited by examiner

VANE SUPPORT SYSTEM

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils in the turbine section are typically formed of a superalloy and may include thermal barrier coatings to extend temperature resistance. Ceramics, such as ceramic matrix composite ("CMC") materials, are also being considered for airfoils. CMCs have high temperature resistance. Despite this attribute, there are unique challenges to implementing CMCs in airfoils.

SUMMARY

A gas turbine engine support system according to an example of the present disclosure includes a support arc segment piece that defines first and second radial sides, axially forward and aft sides, and first and second circumferential mate face sides. The first radial side has a radially open socket that is configured to engage a mating component and transmit loads from the mating component. The radially open socket is elongated in an axial direction with respect to the axially forward and aft sides. The support arc segment piece has radial and axial reaction surfaces configured, respectively, to transmit radial and axial components of the loads from the mating component.

In a further embodiment of any of the foregoing embodiments, the support arc segment piece is a single crystal alloy.

In a further embodiment of any of the foregoing embodiments, the radially open socket extends from the axially forward side to the axially aft side.

In a further embodiment of any of the foregoing embodiments, the radially open socket is curved along its length.

In a further embodiment of any of the foregoing embodiments, the radial reaction surface extends from the first circumferential mate face side to the second circumferential mate face side.

In a further embodiment of any of the foregoing embodiments, the axial reaction surface extends from the first circumferential mate face side to the second circumferential mate face side.

In a further embodiment of any of the foregoing embodiments, the first radial side includes a seal slot that has a first portion and a second portion. The first portion of the seal slot is between the first circumferential mate face side and the radially open socket and the second portion of the seal slot is between the second circumferential mate face side and the radially open socket.

In a further embodiment of any of the foregoing embodiments, each of the seal slot include an axial leg and a circumferential leg.

In a further embodiment of any of the foregoing embodiments, the second radial side has an anti-rotation lock.

In a further embodiment of any of the foregoing embodiments, the support arc segment piece defines a manifold region and at least one opening that connects the radially outer side with the manifold region.

A gas turbine engine support system according to an example of the present disclosure includes an outer case and vane support arc segment pieces. Each vane support arc segment piece defines first and second radial sides, axially forward and aft sides, and first and second circumferential mate face sides. The first radial side has a radially open socket. The radially open socket is elongated in an axial direction with respect to the axially forward and aft sides. The vane support arc segment piece has radial and axial reaction surfaces on, respectively, the radially outer side and the axially aft side. The radial and axial reaction surfaces interface with the outer case and vane arc segments. Each said vane arc segment defines a platform and an airfoil section that extends from the platform. The platform defines a radial flange of complementary geometry to the radially open sockets of the vane support arc segment pieces. The radial flange projects into a corresponding one of the radially open sockets to transmit loads through the vane support arc segment piece to the outer case via the radial and axial reaction surfaces.

In a further embodiment of any of the foregoing embodiments, the vane support arc segment piece is a single crystal alloy and the vane arc segments are formed of ceramic matrix composite.

In a further embodiment of any of the foregoing embodiments, the first radial side includes a seal slot that has a first portion and a second portion. The first portion of the seal slot is between the first circumferential mate face side and the radially open socket and the second portion of the seal slot is between the second circumferential mate face side and the radially open socket.

In a further embodiment of any of the foregoing embodiments, the seal slot includes an axial leg and a circumferential leg.

In a further embodiment of any of the foregoing embodiments, the axial and radial reaction surfaces extend from the first circumferential mate face side to the second circumferential mate face side.

In a further embodiment of any of the foregoing embodiments, the second radial side has an anti-rotation lock, and the vane support arc segment piece defines a manifold region and at least one opening that connects the radially outer side with the manifold region.

In a further embodiment of any of the foregoing embodiments, the radially open socket extends from the axially forward side to the axially aft side and is curved along its length.

A gas turbine engine vane support system according to an example of the present disclosure includes an outer case and vane support arc segment pieces. Each said vane support arc segment piece defines first and second radial sides, axially forward and aft sides, and first and second circumferential mate face sides. The first radial side has a radially open socket. The radially open socket is elongated in an axial direction with respect to the axially forward and aft sides. The vane support arc segment piece has radial and axial reaction surfaces on, respectively, the radially outer side and the axially aft side. The radial and axial reaction surfaces interface with the outer case and vane arc segments. Each vane arc segment defines a platform and an airfoil section that extends from the platform. The platform defines a radial flange of complementary geometry to the radially open sockets of the vane support arc segment pieces. The radial flange projects into a corresponding one of the radially open sockets and transmitting aerodynamic loads from the vane arc segment through the vane support arc segment piece to the outer case via the radial and axial reaction surfaces.

In a further embodiment of any of the foregoing embodiments, the vane support arc segment piece is a single crystal alloy and the vane arc segments are formed of ceramic matrix composite.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
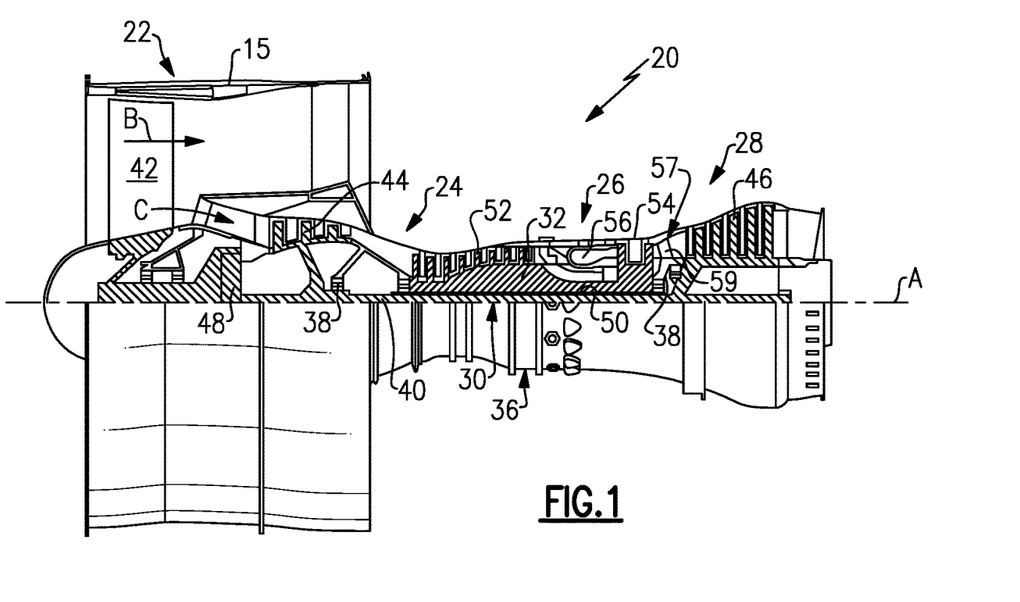
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram} \,°\, R)/(518.7°\, R)]^{0.5}$. The "Low corrected fan tip speed" as disclosed herein according to one non-limiting embodiment is less than about 1150 ft/second (350.5 meters/second).

Figure 2A:
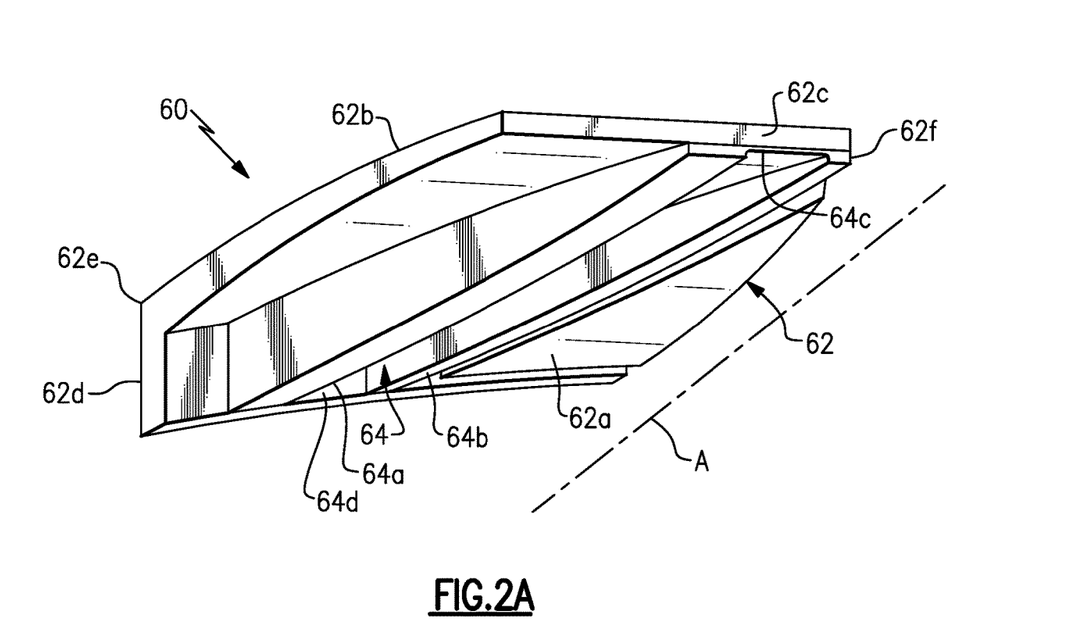
FIG. 2A illustrates a support arc segment of the engine.

FIG. 2A illustrates a representative portion of a support system 60. The support system 60 includes a plurality of support arc segment pieces 62 (one shown). In general, the support arc segment pieces 62 are situated in a circumferential arrangement in the gas turbine engine 20, between a mating component in the core gas path and an adjacent support structure, such as a case. The support arc segment pieces 62 serve to support the mating components in that the support arc segment pieces 62 transmit loads from the mating components to the support structure. Additionally, for mating components that run at very high operating temperatures (e.g., ceramic components), the support arc segment pieces 62 may also serve as a thermal buffer between the mating components and a less thermally tolerant support structure.

Each support arc segment piece 62 defines first and second radial sides 62a/62b, axially forward and aft sides 62c/62d, and first and second circumferential mate face sides 62e/62e. Depending on the location of the support arc segment piece 62 in the engine 20 with respect to the location of the mating component and engine axis A, the first radial side 62a may be an inner radial side and the second radial side 62e may be a radially outer side, or vice versa.

The first radial side 62a has a radially open socket 64 that is generally elongated in an axial direction (relative to engine axis A). In the illustrated example, the radially open socket 64 extends from the axially forward side 62c to the axially aft side 62d and is curved along its length It is also contemplated that the radially open socket 64 could extend only a partial length of the full distance between the sides 62c/62d, such as greater than at least 50% of the length. In further examples, the socket 64 is differently curved, straight, faceted, or combinations thereof such that the socket 64 is complementary in geometry to that of a radial flange of the mating component.

The radially open socket 64 is configured by its shape to engage with a mating component, as mentioned above. As an example, the mating component may be a vane but alternatively may be an outer air seal or other component in the core gas path of the engine 20. In this example, the radially open socket 64 is a slot that has a shape that is defined by opposed circumferential side walls 64a/64b, a floor wall 64c, and an axial wall 64d. As shown, the slot is three-sided, although as will be discussed below the socket 64 may alternatively exclude one of the side walls 64a/64 depending on load transmission. The mating component will have a radial flange portion that is complementary in geometry to that of the radially open socket 64 such that the sides and top of the radial flange portion either contact or closely fit the side walls 64a/64b, floor wall 64c, and the axial wall 64d. Such contact or close fit enables loads to be transmitted from the mating component to the support structure. In that regard, the support arc segment piece 62 (see rotated view in FIG. 2B) also has radial and axial reaction surfaces 66a/66b.

Figure 2B:
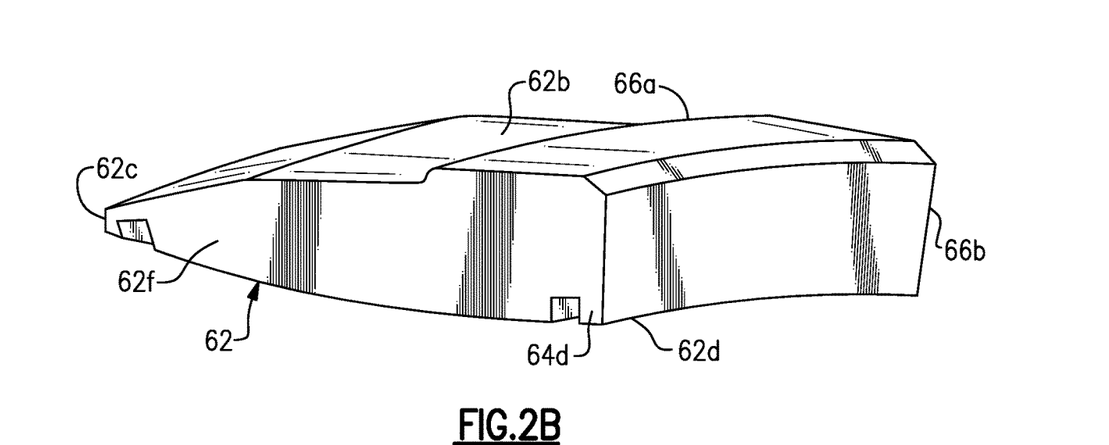
FIG. 2B illustrates a rotated view of the support arc segment.

The radial reaction surface 66a is on the second radial side 62b, and the axial reaction surface 66b is on the axially aft side 62d. The radial and axial reaction surfaces 66a/66b are configured, respectively, to transmit radial and axial components of the loads from the mating component. For example, the reaction surfaces 66a/66b are relatively large in order to distribute reaction loads, are complimentary in shape with mating surfaces on the support structure, and extend from the first circumferential mate face side 62e to the second circumferential mate face side 62f. If further loads distribution is required, additional portions of the second radial side 62a may also serve as reaction surfaces.

During operation of the engine 20, loads on the mating components, such as aerodynamic loads, are transmitted from the radial flange of the mating component to support arc segment piece 62 via the radially open socket 64. For example, the radial component of the loads are received into the support arc segment piece 62 through the floor wall 64c of the socket 64, and the axial component of the loads are received into the support arc segment piece 62 via through the axial wall 64d of the socket 64. The support arc segment piece 62 then transmits the radial loads through the radial reaction surface 66a to the support structure and transmits the axial loads through the axial reaction surface 66b to the support structure. The side walls 64a/64b facilitate constraining the radial flange of the mating component, such as constraining circumferential movement. In that regard, in modified examples the side wall 64a may be excluded or, of the load are reverse the side wall 64b may be excluded.

The support arc segment 62 may also serve as a thermal buffer. For example, ceramic mating components may operate at very high temperatures. The support arc segment piece 62 may be formed of a single crystal alloy, which enables the support arc segment piece 62 to maintain high strength at high exposure temperatures while also shielding the support structure from the high temperatures. Alternatively, if stresses are relatively low, the support arc segment piece 62 may be formed of a ceramic material, such as a ceramic matrix composite. Moreover, since the support arc segment 62 is in essence sandwiched between the mating component and the support structure rather than being rigidly affixed, the support arc segment 62 facilitates reducing thermal constraints that may otherwise induce higher stresses.

Figure 3:
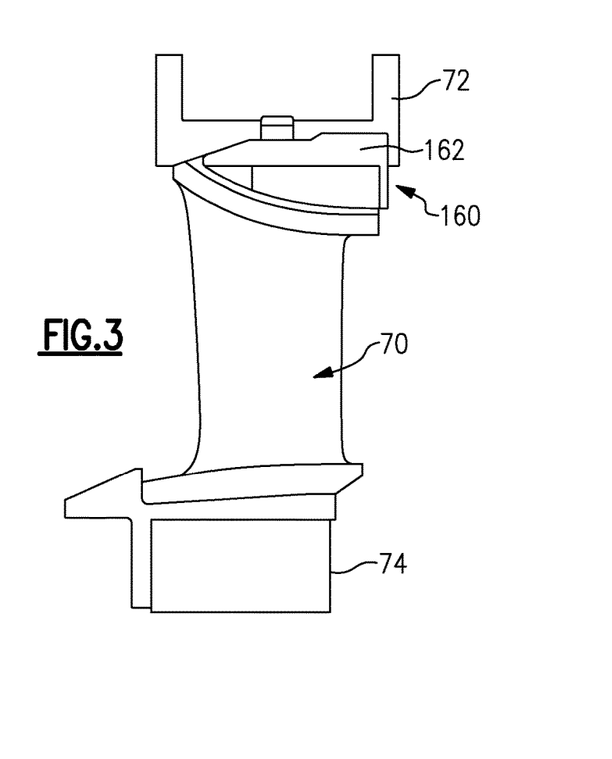
FIG. 3 illustrates a support system of the gas turbine engine.

FIG. 3 illustrates a circumferential, wireframe view of another example support system 160, with a vane support arc segment 162, a vane arc segment 70, an outer support structure 72, and an inner support structure 74. Generally, the support system 160 has a ring-strut-ring configuration in which the inner and outer support structures 72/74 serve as support rings and the vane arc segment 70 serves as a strut. Unless described otherwise below, the vane support arc segment 162 is understood to incorporate the same features and benefits as the above-described support segment 62. It is also to be appreciated that, although the vane support arc segment 162 is situated at the radially outer end of the vane arc segment 70, in alternate embodiments the vane support arc segment 162 may be at the radially inner end of a vane support arc segment.

Figure 4:
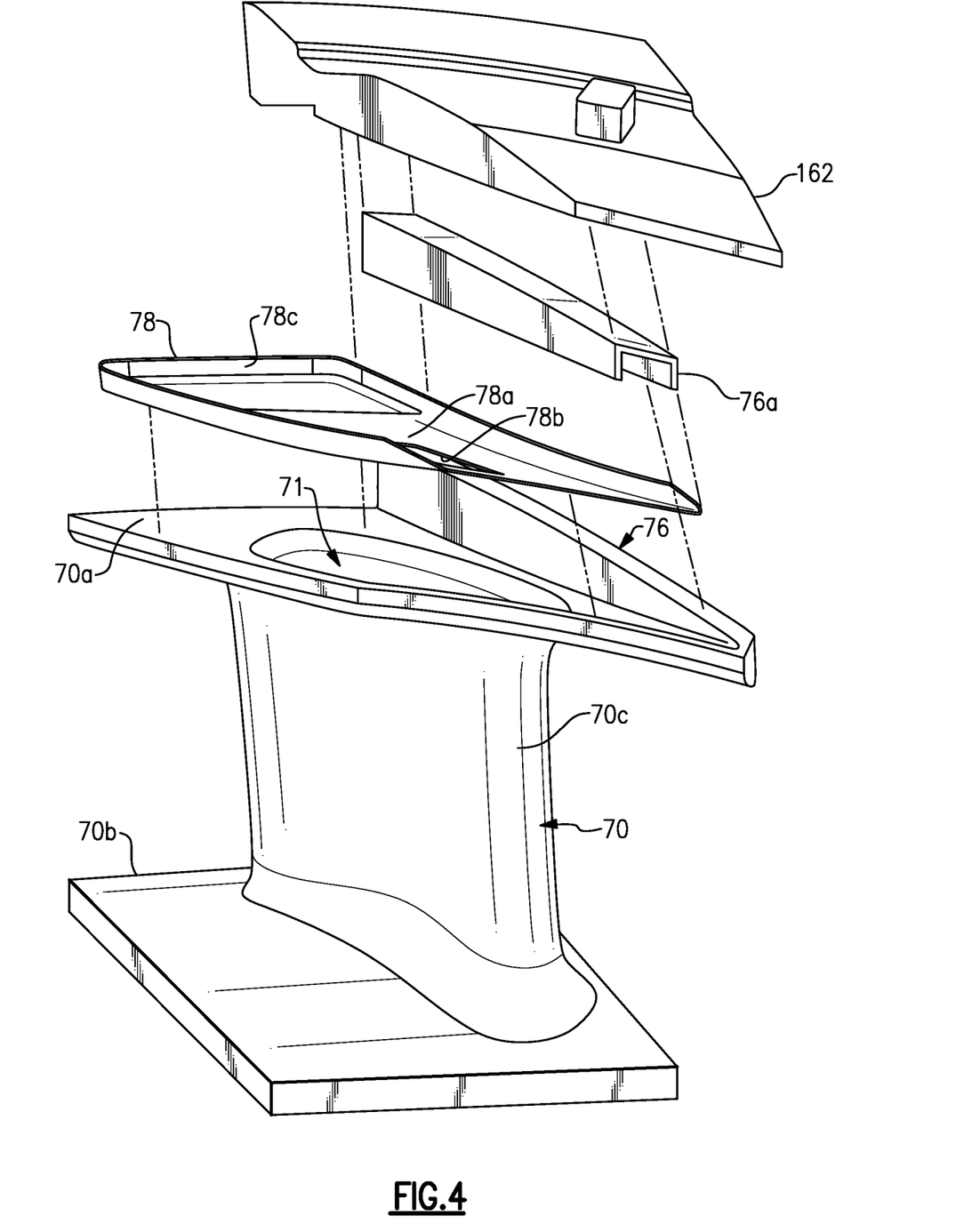
FIG. 4 illustrates an expanded view of a portion of the support system.

FIG. 4 illustrates an expanded view of a portion of the support system 160, which in this example is from the turbine section 28 of the engine 20. The vane arc segment 70 includes first and second platforms 70a/70b and an airfoil section 70c that extends between the first and second platforms 70a/70b. The airfoil section 70c has a hollow interior 71 and defines a leading end, a trailing end, and pressure and suction sides. In this example, the first platform 70a is a radially outer platform and the second platform 70b is a radially inner platform.

The first platform 70a includes a radial flange 76 that projects (radially) from the non-gaspath side thereof. The radial flange 76 is generally elongated in the axial direction. The vane arc segment 70 in the illustrated example is continuous in that the platforms 70a/70b and airfoil section 70c constitute a single, uninterrupted body. As an example, the vane arc segment 70 may be formed of a ceramic material, such as a ceramic matrix composite that has ceramic fibers disposed in a ceramic matrix. The ceramic matrix composite may be, but is not limited to, a SiC/SiC ceramic matrix composite in which SiC fibers are disposed within a SiC matrix. The ceramic fibers may be provided in fiber plies.

During operation of the engine 20, combustion gases flow across the airfoil section 70c and gaspath sides of the platforms 70a/70b. The flow causes aerodynamic loads on the vane arc segment 70. There may also be additional loads imparted on the vane arc segment 70 from other hardware that is connected with the vane arc segment 70. The aerodynamic loads (and additional loads) are transmitted through the vane arc segment 70 into the vane support arc segment 162. In this regard, the radial flange 76 serves as the primary load-bearing feature to transmit such loads.

Optionally, the radial flange 76 includes a flange cap 76a that fits there over. For example, the flange cap 76a is formed of a metallic alloy and facilitates stress distribution on the radial flange 76.

In this example, there is also a seal 78 situated adjacent the flange cap 76a. For example, the seal 78 may be provided as a two-piece seal. The seal 78 includes a seal floor 78a that defines an opening 78b. The opening 78b sits over the hollow interior 71 of the airfoil section 70c, facilitating access to the hollow interior 71. The seal 78 further includes a rail 78c that projects radially from, and extends around, the perimeter of the seal floor 78a. As will be described below, the rail 78c serves as a feather seal in the vane support arc segment 162.

Figure 5A:
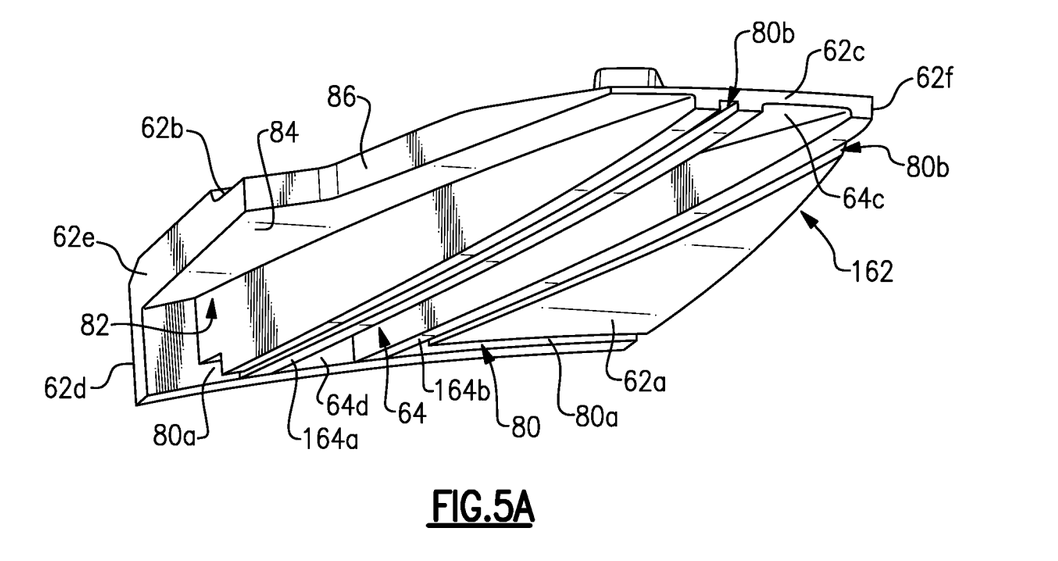
FIG. 5A illustrates a vane support arc segment of the support system.
Figure 5B:
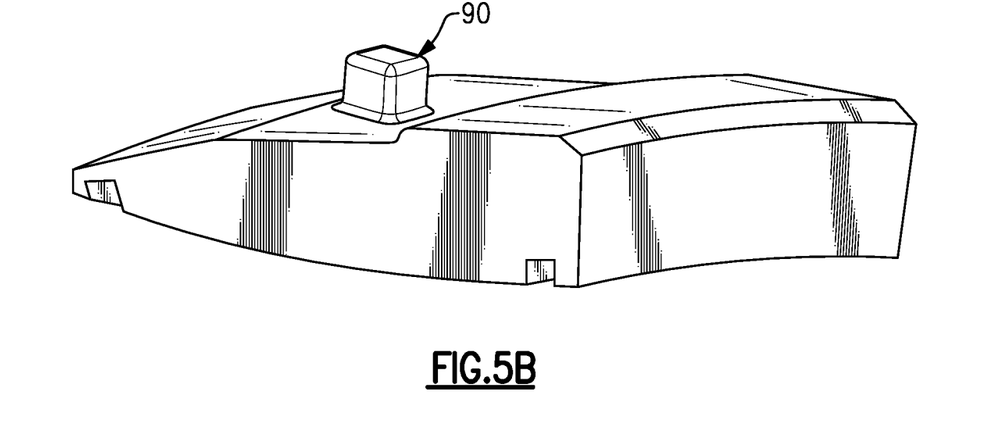
FIG. 5B illustrates a rotated view of the vane support arc segment.

FIG. 5A illustrates an isolated view of the vane support arc segment 162, and FIG. 5B illustrates a rotated view of the vane support arc segment 162. In this example, the radially open socket 64 is defined by opposed circumferential side walls 164a/164b, the floor wall 64c, and the axial wall 64d. The vane support arc segment 162 also includes a seal slot 80. The seal slot 80 includes a circumferential leg 80a and axial legs 80b. In this example, one of the axial legs 80b is between the radially open socket 64 and the circumferential side 62e, and the other axial leg 80b is between the radially open socket 64 and the circumferential side 62f. In this regard, the radially open socket 64 divides the seal slot 80 such that one seal 78 will be disposed in the portion of the seal slot 80 to one side of the radially open socket 64 and a second seal 78 will be disposed in the portion of the seal slot 80 to the other side of the radially open socket 64. Thus, each vane support arc segment 162 seals with two of the seals 78, i.e., each seal 78 spans two vane support arc segments 162, which facilitates sealing between adjacent vane support arc segments 162.

The seals 78 also serve to guide cooling air flow into the hollow interior 71 of the airfoil section 70c. For example, the vane support arc segment 162 defines a manifold region 82. The manifold region 82 is delimited by the axial wall 64d, the side wall 164a, and radial wall 84 (which also forms the floor wall 64c). There is at least one opening 86 that connects the second radial side 62b with the manifold region 82. The perimeter of the opening 86 is defined, in part, by the radial wall 84, and the remaining perimeter of the opening 86 is defined by the circumferential mate face side 62f of the neighboring vane support arc segment 162. In this regard, cooling air can be provided to the second radial side 62b and flow through the opening 86 into the manifold region 82. The seal 78 contains the cooling air in the manifold region 82 and guides the cooling air into the hollow interior 71 of the airfoil section 70c. The airfoil section 70c may use the cooling air for cooling and/or guide the cooling air on to a downstream passage to another component for cooling. Alternatively, rather than the single opening 86, the vane support arc segment 162 may include a plurality of orifices, sockets, or other type of opening for cooling air flow.

Optionally, as depicted in FIG. 5B, the second radial side 62b has an anti-rotation lock 90. In this example, the lock 90 is a protrusion that is substantially rectangular in cross-section in order to distribute loads. The lock 90 engages with the outer support structure 72 to limit rotational (circumferential) movement of the vane support arc segment 162.

In the illustrated examples, the vane support arc segment 162 is a "singlet" in which a single vane support arc segment 162 supports only a single vane arc segment 70. Such a singlet configuration enables the vane support arc segment 162 to be relatively small, which facilitates reductions in thermal stresses and eases manufacturability. For example, a relatively large full ring structure would be difficult or impossible to cast as a single crystal alloy. Rather, such large components are more feasible as a cast multi-crystalline alloy. However, in comparison to a single crystal alloy, such alloys have lower thermal resistance and strength. In turn, that makes direct engagement challenging between a component such as the outer support structure 72 and the vane arc segment 70 that operates at very high temperature. The vane support arc segment 162, when formed of a single crystal alloy, can thus serve as a thermal buffer, yet also maintain strength in order to transmit loads from the vane arc segment 70. Modified examples are also contemplated in which the vane support arc segment 162 and the vane arc segment 70 are "multiplets," wherein the vane arc segment 70 has more than one airfoil section 70c, such as two or three airfoil sections 70a, and the vane support arc segment 162 has a corresponding number of radially open sockets 64. As will be appreciated, a multiplet may be substantially larger than a singlet and may thus have somewhat higher thermal stresses.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine support system comprising:
 a support arc segment piece defining a first radial side and a second radial side, an axially forward side that is forward-facing and an axially aft side that is aft-facing, and a first circumferential mate face side and a second circumferential mate face side, the first radial side having a radially open socket configured to engage a mating component and transmit loads from the mating component, the radially open socket being elongated in an axial direction with respect to the axially forward side and the axially aft side and the radially open socket defining a length along which the radially open socket is curved, the support arc segment piece having a radial reaction surface and an axial reaction surface configured, respectively, to transmit radial and axial components of the loads from the mating component.

2. The gas turbine engine support system as recited in claim 1, wherein the support arc segment piece is a single crystal alloy.

3. The gas turbine engine support system as recited in claim 1, wherein the radially open socket extends from the axially forward side to the axially aft side.

4. The gas turbine engine support system as recited in claim 1, wherein the radial reaction surface extends from the first circumferential mate face side to the second circumferential mate face side.

5. The gas turbine engine support system as recited in claim 4, wherein the axial reaction surface extends from the first circumferential mate face side to the second circumferential mate face side.

6. The gas turbine engine support system as recited in claim 1, wherein the first radial side includes a seal slot that has a first portion and a second portion, the first portion of the seal slot is between the first circumferential mate face side and the radially open socket and the second portion of the seal slot is between the second circumferential mate face side and the radially open socket.

7. The gas turbine engine support system as recited in claim 6, wherein each of the seal slot include an axial leg and a circumferential leg.

8. The gas turbine engine support system as recited in claim 1, wherein the second radial side has an anti-rotation lock.

9. The gas turbine engine support system as recited in claim 1, wherein the support arc segment piece defines a manifold region and at least one opening that connects the second radial side with the manifold region.

10. A gas turbine engine support system comprising:
an outer case;
vane support arc segment pieces, each said vane support arc segment piece defining a first radial side and a second radial side, an axially forward side that is forward-facing and an axially aft side that is aft-facing, and a first circumferential mate face side and a second circumferential mate face side, the first radial side having a radially open socket, the radially open socket being elongated in an axial direction with respect to the axially forward side and the axially aft side, the vane support arc segment piece having a radial reaction surface and an axial reaction surface on, respectively, the second radial side and the axially aft side, the a radial reaction surface and the axial reaction surface interfacing with the outer case; and
vane arc segments, each said vane arc segment defining a platform and an airfoil section extending from the platform, the platform defining a radial flange of complementary geometry to the radially open sockets of the vane support arc segment pieces, the radial flange projecting into a corresponding one of the radially open sockets to transmit loads through the vane support arc segment piece to the outer case via the a radial reaction surface and the axial reaction surface.

11. The gas turbine engine support system as recited in claim 10, wherein the vane support arc segment piece is a single crystal alloy and the vane arc segments are formed of ceramic matrix composite.

12. The gas turbine engine support system as recited in claim 11, wherein the first radial side includes a seal slot that has a first portion and a second portion, the first portion of the seal slot is between the first circumferential mate face side and the radially open socket and the second portion of the seal slot is between the second circumferential mate face side and the radially open socket.

13. The gas turbine engine support system as recited in claim 12, wherein the seal slot includes an axial leg and a circumferential leg.

14. The gas turbine engine support system as recited in claim 13, wherein the axial and radial reaction surfaces extend from the first circumferential mate face side to the second circumferential mate face side.

15. The gas turbine engine support system as recited in claim 14, wherein the second radial side has an anti-rotation lock, and the vane support arc segment piece defines a manifold region and at least one opening that connects the radially outer side with the manifold region.

16. The gas turbine engine support system as recited in claim 15, wherein the radially open socket extends from the axially forward side to the axially aft side and defines a length along which the radially open socket is curved.

17. A gas turbine engine vane support system comprising:
an outer case;
vane support arc segment pieces, each said vane support arc segment piece defining a first radial side and a second radial side, an axially forward side that is forward-facing and an axially aft side that is aft-facing, and a first circumferential mate face side and a second circumferential mate face side, the first radial side having a radially open socket, the radially open socket being elongated in an axial direction with respect to the axially forward side and the axially aft side, the vane support arc segment piece having a radial reaction surface and an axial reaction surface on, respectively, the second radial side and the axially aft side, the a radial reaction surface and the axial reaction surface interfacing with the outer case;
vane arc segments, each said vane arc segment defining a platform and an airfoil section extending from the platform, the platform defining a radial flange of complementary geometry to the radially open sockets of the vane support arc segment pieces, the radial flange projecting into a corresponding one of the radially open sockets and transmitting aerodynamic loads from the vane arc segment through the vane support arc segment piece to the outer case via a radial reaction surface and the axial reaction surface.

18. The gas turbine engine support system as recited in claim 17, wherein the vane support arc segment piece is a single crystal alloy and the vane arc segments are formed of ceramic matrix composite.

* * * * *